UNITED STATES PATENT OFFICE.

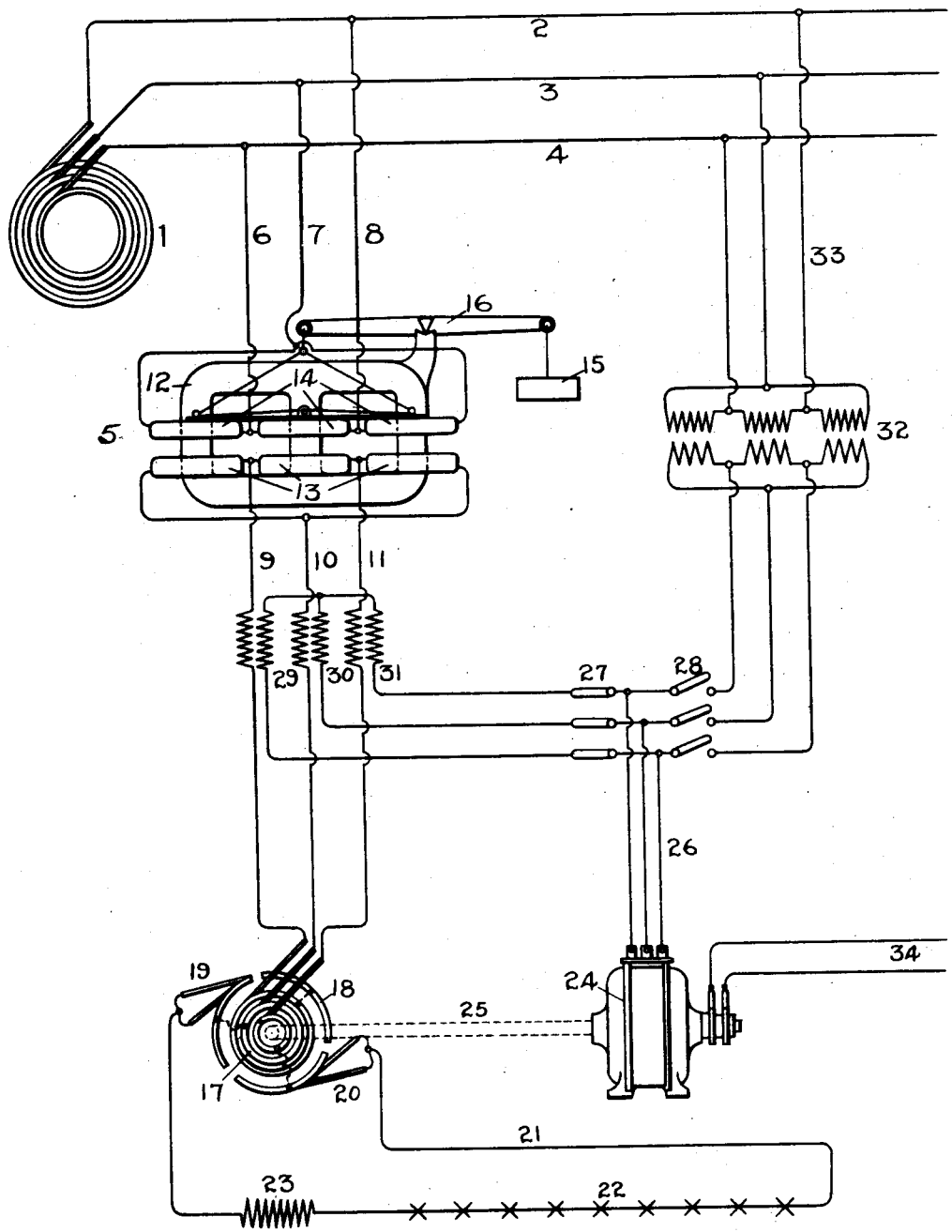

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 712,464, dated October 28, 1902.

Original application filed July 11, 1900, Serial No. 23,213. Divided and this application filed March 31, 1902. Serial No. 100,670. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 2,804, a division of my prior applicaion, Serial No. 23,213, filed July 11, 1900,) of which the following is a specification.

My present invention relates to systems of distribution for alternating currents, and among other features comprises certain improvements in the operation of synchronous dynamo-electric machines—such, for example, as synchronous motors.

Although not limited to use in any particular relation, my invention is of especial value in connection with rectifier systems in which alternating current is changed to a unidirectional current by means of a rectifying-commutator driven by a synchronous motor. In such systems it is usual to obtain the constant current by transformation from a constant-potential source. It is thus possible to drive the synchronous motor by current either from the constant-potential source or by the constant current itself; but it has been found in practice that the latter is preferable because better commutation is secured due to the shifting backward or forward of the rotating member of the synchronous motor and the rectifying-commutator driven thereby in response to the corresponding shifting in phase of the constant alternating current. The points of commutation are thus adjusted to a considerable extent automatically without shifting the commutator-brushes. There are, however, certain attendant difficulties. The constant current being limited in value is frequently insufficient for supplying the requisite starting-current for the synchronous motor. I have overcome this difficulty by starting the synchronous motor from the constant-potential mains, from which an ample supply of current is obtainable. After being brought into synchronism the motor may then be switched over to the constant-current circuit or to a circuit derived inductively therefrom.

The drawing represents a system of distribution embodying my invention.

A source of alternating current is indicated conventionally at 1. It may be of any number of phases, but by way of example is here shown as three-phase. Transmission-lines 2 3 4 extend therefrom and supply energy to suitable consumption-circuits. A rectifier system is shown as supplied with energy from these mains. The arrangement illustrated by way of example comprises a three-phase constant-current transformer 5, having primary leads 6 7 8 and secondary leads 9 10 11. As the construction of the transformer forms no portion of my invention, nothing more than a brief description of the same is necessary. It may consist of a three-branched core 12, having three secondary coils 13 and the same number of primary coils 14. Either set of coils may be fixed, while the other is movable, or in some instances both sets of coils may move. I have, however, shown the secondary coils 13 as fixed and the primary coils 14 partially counterbalanced by a weight 15, operating through the lever 16. The secondary leads 9 10 11 pass to a rectifying device consisting in the instance shown of collector-rings 17, to which the secondary leads are connected and which in turn are connected to appropriate segments of a rectifying-commutator, (indicated at 18.) Sets of brushes 19 and 20 bear upon the segments of the commutating device and conduct the rectified current to a consumption-circuit 21, containing in series translating devices—such, for example, as arc-lamps, (indicated conventionally by the crosses 22.) To improve the commutation, an inductance-coil 23 may be included in series with this circuit. This will have the additional effect of smoothing out the current in this circuit and rendering it more uniform. The rectifying device is driven by means of a suitable mechanical connection with a synchronous dynamo-electric machine—such, for example, as a synchronous motor 24. As illustrated, the rectifying-commutator is mounted on the same shaft with the rotating member of the motor, this mechanical connection being indicated by means of the dotted lines 25. The rectifying-commutator and brushes are shown in the drawing merely in diagram; but it is of course to be understood that they are to be mounted in suitable mechanical relation to the synchronous motor and not in the displaced position shown for convenience in illustration. The leads of the synchronous motor are indicated at 26 and are connected with two sets of switches 27 and 28, respectively. The switches 27 operate to connect the synchronous-motor leads to the secondary terminals of three series transformers 29, 30, and 31, the primaries of which are placed, respectively, in series with the secondary leads 9 10 11 of the alternating constant-current circuit fed from the constant-current transformer 5. The switches 28 serve to connect the leads of the synchronous motor to the terminals of a source of constant potential—such, for example, as the secondary windings of a step-down transformer 32, the primary windings of which are connected through leads 33 across the main supply system 2 3 4.

When the rectifier is to be started up, the switches 27 are opened, while the switches 28 are closed, thereby connecting the synchronous motor across the constant-potential alternating circuit. The comparatively large starting-current required by the motor is supplied thereto without difficulty, thereby causing the motor to start up and accelerate until it reaches synchronism, at which time the current required is much less than at starting and of a value such as may be supplied from the constant-current circuit. The change over from the constant-potential circuit to the constant-current circuit may then be effected by opening the switches 28 and closing the switches 27, the resulting arrangement of circuits being as indicated in the drawing. Instead, however, of normally supplying the motor from the secondary of the constant-current transformer it is obvious that it may be supplied from the primary circuit.

If the synchronous motor is of the type requiring a direct-current field excitation, it is of course to be understood that the current may be supplied from any suitable source. In the drawing the direct-current field-circuit is indicated merely by the leads 34.

What I claim as new, and desire to secure by Letters Patent of the United States, is—

1. The combination of a motor, means for normally supplying the motor with constant current, and means for starting the motor with current at constant potential.

2. The combination of a source of constant current, a source of current of constant potential, a motor, and means for connecting said motor at will either to the source of constant current or to the source of current of constant potential.

3. The combination of a source of alternating current of constant value, a rectifier therefor, a motor for driving the rectifier, a source of current of substantially constant potential, and means for supplying said motor with current from either of said sources.

In witness whereof I have hereunto set my hand this 29th day of March, 1902.

CHARLES P. STEINMETZ.

Witnesses:
BENJAMIN B. HULL,
HELEN ORFORD.